Feb. 20, 1962 W. H. DANIELS 3,022,107
VEHICLE CLOSURE
Filed Oct. 31, 1960 2 Sheets-Sheet 1

INVENTOR.
William H. Daniels
BY
Herbert Furman
ATTORNEY

Feb. 20, 1962 W. H. DANIELS 3,022,107
VEHICLE CLOSURE

Filed Oct. 31, 1960 2 Sheets-Sheet 2

INVENTOR.
William H. Daniels
BY Herbert Furman
ATTORNEY

United States Patent Office 3,022,107
Patented Feb. 20, 1962

3,022,107
VEHICLE CLOSURE
William H. Daniels, Southfield, Mich., assignor to General Motors Corporation, Detroit, Mich., a corporation of Delaware
Filed Oct. 31, 1960, Ser. No. 66,147
6 Claims. (Cl. 296—37)

This invention relates to vehicle closures and more particularly to an improved hinge means for vehicle closures.

The hinge means of this invention is particularly intended for use with a pair of vehicle closures which swing oppositely with respect to each other during movement between open and closed positions. The hinge means interconnects the closures whereby movement of one between its open and closed positions results in simultaneous movement of the other between its open and closed positions. Thus, either closure may be moved without having to separately move the other closure.

The primary object of this invention is to provide an improved hinge means for vehicle closures. Another object of this invention is to provide an improved hinge means for a pair of vehicle closures movable oppositely with respect to each other between open and closed positions. A further object of this invention is to provide an improved hinge means for a pair of vehicle closures movable oppositely with respect to each other between open and closed positions, with the hinge means hingedly mounting the closure on a support member and also interconnecting the closures whereby movement of one results in simultaneous movement of the other.

These and other objects of this invention will be readily apparent from the following specification and drawings wherein.

Figure 1:
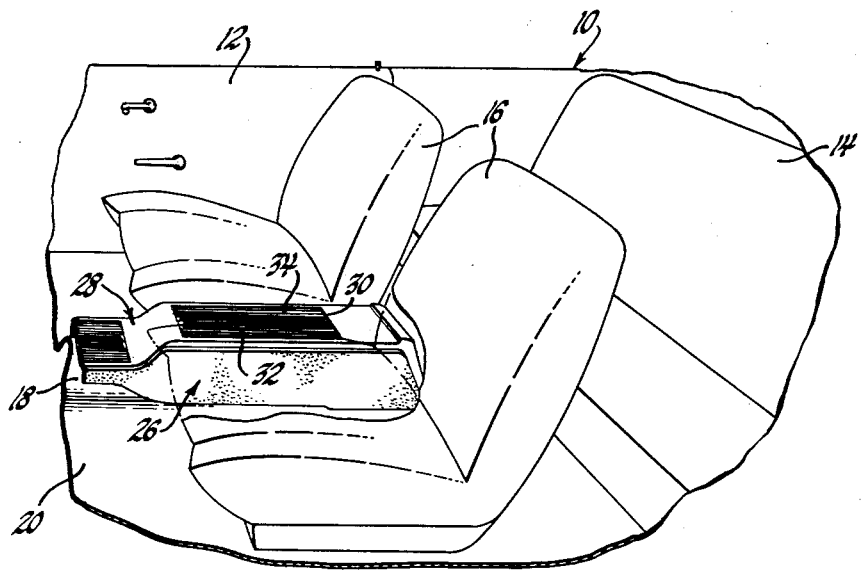
FIGURE 1 is a partial perspective view of a vehicle body embodying a compartment and a pair of closures therefor interconnected by hinge means according to this invention for movement oppositely with respect to each other between open and closed positions with respect to the compartment.
Figure 2:
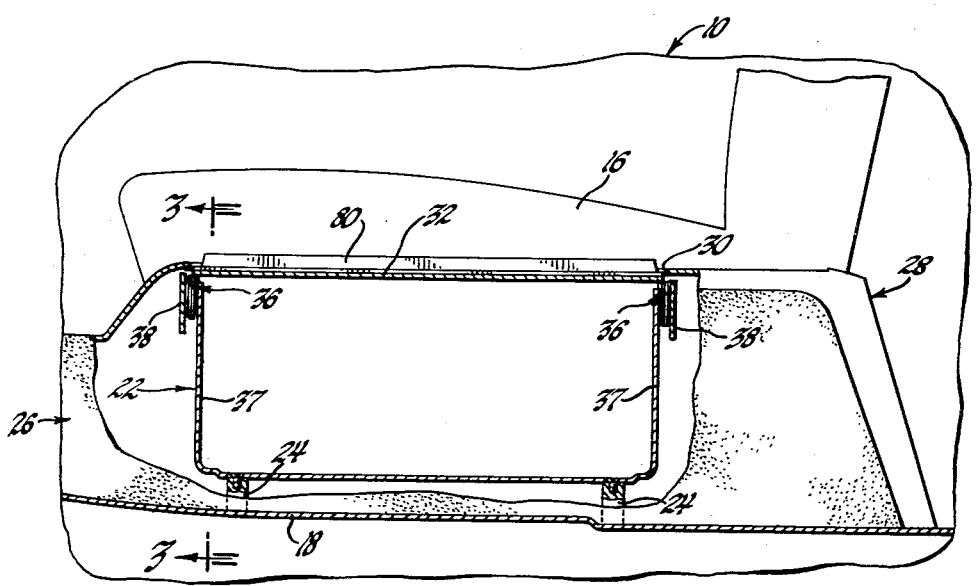
FIGURE 2 is an enlarged partially broken away elevational view of a portion of FIGURE 1.

Referring now particularly to FIGURE 1 of the drawings, a convertible type vehicle body 10 includes a front door 12, a rear seat 14, and a pair of front seats 16 of the "bucket" type which are disposed on opposite sides of the usual tunnel 18 provided in the body floor pan 20 to allow passage of the drive shaft between the front and rear ends of the body. As best shown in FIGURE 2 of the drawings, a compartment or box 22 is mounted on the tunnel 18 by a spaced pair of lugs 24 secured thereto and removably secured to the bottom wall of the compartment. The compartment 22 may be used for storage purposes or for other purposes as desired by the driver or passengers.

Figure 3:
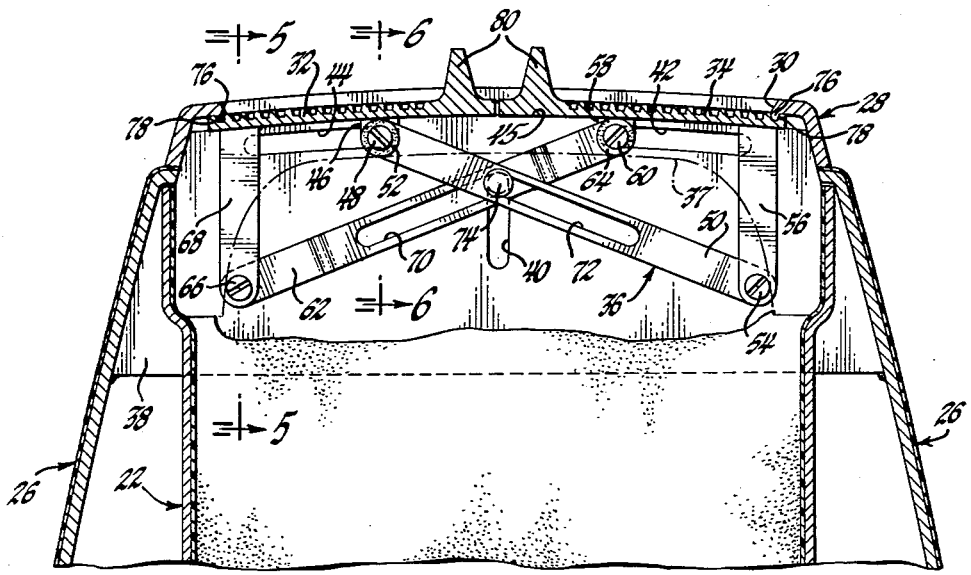
FIGURE 3 is an enlarged partially broken away view taken generally along the plane indicated by line 3—3 of FIGURE 2 and showing the closures in closed position.
Figure 4:
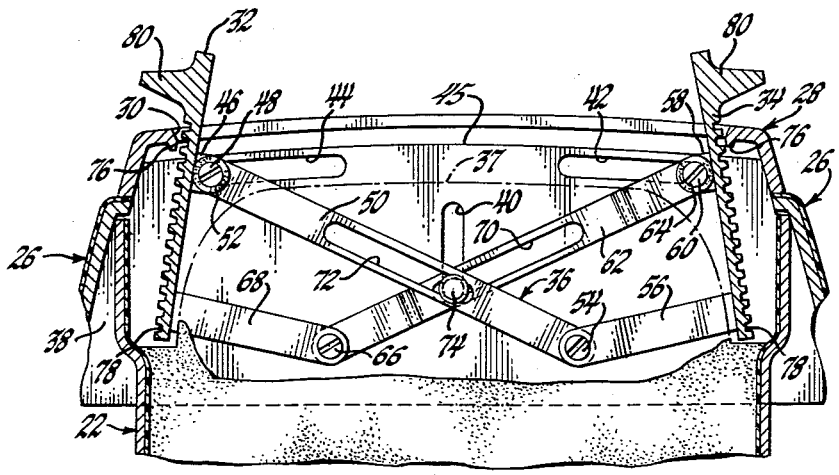
FIGURE 4 is a view similar to FIGURE 3 showing the closures in open position.

A pair of wall structures 26 extend longitudinally along the sides of the tunnel 18 and are suitably secured thereto. The wall structures 26 are interconnected by an upper wall or cap structure 28 which is suitably secured to the wall structures 26 and is provided with a generally rectangularly shaped aperture 30 in general alignment with the opening of the compartment 22. Opening 30 is opened and closed by a pair of like closure members 32 and 34 which are movable between a closed position, as shown in FIGURES 1 through 3, wherein they are disposed in a generally horizontal position, and an open position, as shown in FIGURE 4, wherein they are disposed in a generally vertical position so as to provide access to the compartment 22. It will be noted that the closures 32 and 34 move oppositely with respect to each other during movement thereof between their opened and closed positions. The closures 32 and 34 are mounted on the wall structures 26 and 28 by hinge means 36 according to this invention, which will now be described with reference to FIGURES 3 through 6 of the drawings.

Figure 6:
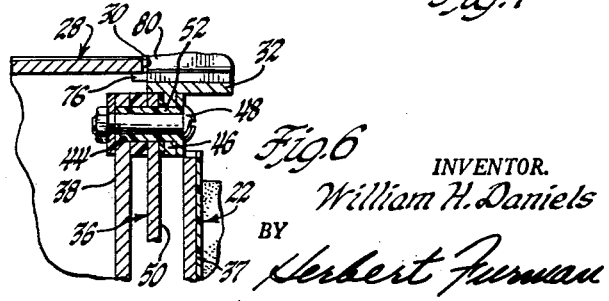
FIGURE 6 is an enlarged sectional view taken generally along the plane indicated by line 6—6 of FIGURE 3.

Wall structures 26 and wall structure 28 are interconnected adjacent the end walls 37 of compartment 22 by transverse support member 38 which are secured thereto. Since the members 38 and hinge means are of like construction at each end of the compartment 22, only one such support member and hinge means will be described, and it will be understood that the other is of like construction. The support member 38 is provided with a generally vertically disposed closed slot 40 located intermediate the side edges thereof and generally coplanar with the longitudinal center line of the compartment 22 and the juxtaposed adjacent free edge portions of the closures 32 and 34. Member 38 further includes a pair of generally horizontally disposed closed slots 42 and 44 which are generally parallel to the slight curvature of the upper edge 45 of member 38 and to the contour of the inner surface of the closures 32 and 34. Closure 32 is provided with a short depending apertured ear 46 inset from the adjacent free edge thereof and pivoted at 48 to one end of a link 50. As shown in FIGURE 6, both the pivot bolt 48 and a headed nylon bearing sleeve 52 therefor extend through an aperture of ear 46, through the apertured end of the link 50 and through slot 44 whereby the pivot must move along a path defined by the slot 44. As shown, the nylon washer provided on each side of the end of link 50 provides for ease of movement of the link relative to ear 46 and member 38. The other end of link 50 is pivoted at 54 to an apertured ear 56 which depends from the closure 34 adjacent the remote edge portion thereof and is of greater extent than the ear 46. The closure 34 includes an apertured ear 58, corresponding to ear 46, which is pivoted at 60 to one end of a link 62, with the pivot 60 being the same as pivot 48, including the pivot bolt 60 and a headed nylon bearing sleeve 64, which extend through the aperture of ear 58 through the apertured end of link 62 and through the slot 42 whereby the pivot 60 must move along a path defined by the slot 42. The other end of the link 62 is pivoted at 66 to an apertured ear 68 which depends from closure 32 adjacent the remote free edge portion thereof and corresponds to the ear 56 of closure 34.

Figure 5:
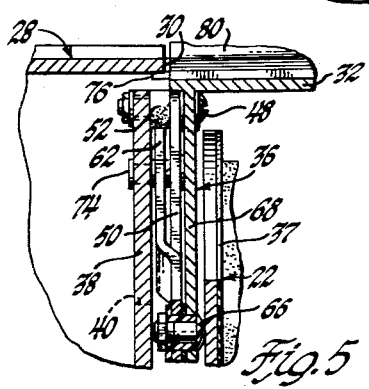
FIGURE 5 is an enlarged sectional view taken generally along the plane indicated by line 5—5 of FIGURE 3.

As shown in FIGURE 5, a nylon bearing sleeve surrounds the pivot bolt 66, and it will be understood that a similar sleeve is provided for the pivot bolt 54. The central portion of the link 62 is offset and is slotted at 70, and the central portion of the link 50 is received within this offset and is slotted at 72, with the slots 70 and 72 being located in overlapping transverse relationship to each other. A double headed stud 74 extends through the slots 70 and 72 and through the slot 40 whereby the stud 74 is limited to generally vertical movement.

When the closures 32 and 34 are in closed position, as shown in FIGURE 3, a longitudinal rib 76 provided along each side edge of the aperture 30 is received within a complementary shaped groove 78 adjacent the remote edge portions of closures 32 and 34, with groove 78 being one of a number of grooves provided on each of the closures 32 and 34. The closures further include a longitudinal rib 80 at the adjacent free edge portion of each, which is intended to be grasped in order to move the closures between their open and closed positions.

When it is desired to move the closures from their closed position of FIGURE 3 to their open position of FIGURE 4, the rib 80 of one of the closures, assume closure 34 is grasped, and the closure 34 is both rotated clockwise as viewed in FIGURE 3, and shifted toward the side edge of aperture 30 to the right as viewed in FIGURE 3. This will cause the links 50 and 62 to be shifted generally downwardly and oppositely to each other, each link shifting generally parallel to itself, as the pivots 48 and 60 move along the slots 44 and 42 from the adjacent ends thereof to the remote ends thereof to both rotate and shift the closure 32 simultaneously with the closure 34. The stud 74 cams the links generally simultaneously downwardly and cooperates with pivots 48 and 60 and slots 42 and 44 to insure that the links 50 and 62 shift at the same general rate to insure simultaneous opposite movement of the closures.

From the foregoing description, it is believed obvious that like opposite manual movement of the closure 32 will result in simultaneous movement of the closure 34, and further, that movement of either closure from its open position of FIGURE 4 to its closed position of FIGURE 3 will result in simultaneous movement of the other closure.

Each closure is located in the closed position thereof by engagement of its respective pivot with the adjacent end of a respective slot and the engagement of the stud 74 with the upper end of the slot and the upper end of the slot of the link respective thereto, to locate the groove 78 of the closure with respect to the rib 76. Likewise, each closure is located in the open position thereof by engagement of its respective pivot with the remote end of a respective slot.

Thus, this invention provides a new and improved hinge means for vehicle closures.

I claim:

1. In combination with a vehicle body having a compartment therein, a pair of oppositely movable closures movable between a generally aligned closed position wherein said closures have adjacent edge portions located in juxtaposed relationship and an open position wherein said closures are located in generally parallel disposed relationship, a first link having one end thereof pivoted to one of said closures adjacent the adjacent edge portion thereof and the other end thereof pivoted to the other of said closures adjacent the remote edge portion thereof, a second link having one end thereof pivoted to said one closure adjacent the remote edge portion thereof and the other end thereof pivoted to the said other closure adjacent the adjacent edge portion thereof whereby said links are arranged in X fashion, and means for shifting said links transversely of each other upon movement of said closures between open and closed positions.

2. In combination with a vehicle body having a compartment therein, a pair of oppositely movable closures movable between a generally aligned closed position wherein said closures have adjacent edge portions located in juxtaposed relationship and an open position wherein said closures are located in generally parallel disposed relationship, a first link having one end thereof pivoted to one of said closures adjacent the adjacent edge portion thereof and the other end thereof pivoted to the other of said closures adjacent the remote edge portion thereof, a second link having one end thereof pivoted to said one closure adjacent the remote edge portion thereof and the other end thereof pivoted to said other closure adjacent the adjacent edge portion thereof whereby said links are arranged in X fashion, and means for shifting said links transversely of each other while substantially maintaining the angular relationship thereof upon movement of said closures between open and closed positions.

3. In combination with a vehicle body having a compartment therein, a pair of oppositely movable closures movable between a generally aligned closed position wherein said closures have adjacent edge portions located in juxtaposed relationship and an open position wherein said closures are located in generally parallel disposed relationship, a first link having one end thereof pivoted to one of said closures adjacent the adjacent edge portion thereof and the other end thereof pivoted to the other of said closures adjacent the remote edge portion thereof, a second link having one end thereof pivoted to said one closure adjacent the remote edge portion thereof and the other end thereof pivoted to said other closure adjacent the adjacent edge portion thereof whereby said links are arranged in X fashion, first guide means guiding one portion of each link along a path located generally parallel to said closures in the closed position thereof, and second guide means guiding another portion of each link along a path located generally parallel to said closures in the open position thereof.

4. In combination with a vehicle body having a compartment therein, a pair of oppositely movable closures movable between a generally aligned closed position wherein said closures have adjacent edge portions located in juxtaposed relationship and an open position wherein said closures are located in generally parallel disposed relationship, a first link having one end thereof pivoted to one of said closures adjacent the adjacent edge portion thereof and the other end thereof pivoted to the other of said closures adjacent a remote portion thereof, a second link having one end thereof pivoted to said other closure adjacent the adjacent edge portion thereof and the other end thereof pivoted to said one closure adjacent the remote edge portion thereof whereby said links are arranged in X fashion, first guide means guiding said one end of each link along a path located generally parallel to said closures in the closed position thereof, and second guide means guiding an intermediate portion of each link along a path located generally parallel to said closures in the open position thereof.

5. In combination with a vehicle body having a compartment therein, a pair of oppositely movable closures movable between a generally aligned closed position wherein said closures have adjacent edge portions located in juxtaposed relationship and an open position wherein said closures are located in generally parallel disposed relationship, a first link having one end thereof pivoted to one of said closures adjacent the adjacent edge portion thereof and the other end thereof pivoted to the other of said closures adjacent a remote portion thereof, a second link having one end thereof pivoted to said other closure adjacent the adjacent edge portion thereof and the other end thereof pivoted to said one closure adjacent the remote edge portion thereof whereby said links are arranged in X fashion, means guiding said one pivoted end of each link along a path located generally parallel to a respective closure, guided means movable along a path located generally parallel to said closures in the open position thereof, and means pivotally and slidably connecting an intermediate portion of each link to said guided means to permit both pivotal and sliding movement of said links relative to each other and to said guided means as said guided means moves along said path respective thereto.

6. In combination with a vehicle body having a compartment therein, a pair of oppositely movable closures movable between a generally aligned closed position wherein said closures have adjacent edge portions located in juxtaposed relationship and an open position wherein said closures are located in generally parallel disposed relationship, a link respective to each closure, first pivot means connecting one end of said links to a respective closure adjacent the adjacent edge portion thereof, second pivot means connecting the other end of each link to the other closure adjacent the remote edge portion thereof, whereby said links are arranged in X fashion, third means pivotally and slidably connecting intermediate portions of said links, means guiding said first pivot means along a path located generally parallel to said closures in the closed position thereof, and means guiding said third pivot means along a path located generally parallel to said closures in the open position thereof.

References Cited in the file of this patent

UNITED STATES PATENTS

| | | |
|---|---|---|
| 676,594 | Vogel | June 18, 1901 |
| 1,072,809 | Baxter | Sept. 9, 1913 |
| 2,408,132 | Weeks | Sept. 24, 1946 |
| 2,710,093 | Raker | June 7, 1955 |